(12) United States Patent
Kondo et al.

(10) Patent No.: US 6,181,991 B1
(45) Date of Patent: *Jan. 30, 2001

(54) ELECTRIC VEHICLE SHARING SYSTEM

(75) Inventors: Shugo Kondo; Masami Ogura; Akihiko Takei, all of Utsunomiya (JP)

(73) Assignee: Honda Giken Kogyo Kabushiki Kaisha, Tokyo (JP)

(*) Notice: Under 35 U.S.C. 154(b), the term of this patent shall be extended for 0 days.

This patent is subject to a terminal disclaimer.

(21) Appl. No.: 09/300,270

(22) Filed: Apr. 27, 1999

(30) Foreign Application Priority Data

Apr. 28, 1998 (JP) .................................. 10-119396

(51) Int. Cl.[7] ............................ G01M 15/00; G06F 17/00
(52) U.S. Cl. ............................ 701/22; 701/200; 701/123; 701/1; 701/30; 701/29
(58) Field of Search .................... 701/22, 30, 1, 701/123, 200, 29

(56) References Cited

U.S. PATENT DOCUMENTS 4,884,054 * 11/1989 Moon, Sr. ..................... 340/309.15
5,539,399 * 7/1996 Takahira et al. ..................... 340/995
5,619,417 * 4/1997 Kendall ................................. 702/63
5,790,976 * 8/1998 Boll et al. ............................ 455/456
5,815,071 * 9/1998 Doyle .................................. 340/439

FOREIGN PATENT DOCUMENTS 8-110998 * 4/1996 (JP) .

OTHER PUBLICATIONS

U.S. Patent Appln. S.N. 09/300,254; Filed Apr. 27, 1999; By: Nakai et al. Title: Vehicle Sharing System.*
U.S. Patent Appln. S.N. 09/300,390; Filed Apr. 27, 1999; By: Kondo et al. Title: Vehicle Sharing System.*

* cited by examiner

Primary Examiner—William A. Cuchlinski, Jr.
Assistant Examiner—Olga Hernandez
(74) Attorney, Agent, or Firm—Arent Fox Kintner Plotkin & Kahn PLLC

(57) ABSTRACT

When a user enters a destination using a touch panel display unit, a system control unit calculates a predicted travel distance from a present position to the destination, determines an electric vehicle having a remaining battery capacity required to travel the calculated predicted travel distance, and supplies the determined electric vehicle to the user.

13 Claims, 11 Drawing Sheets

FIG. 3

ELECTRIC VEHICLE SHARING SYSTEM

BACKGROUND OF THE INVENTION

1. Field of the Invention

The present invention relates to an electric vehicle sharing system for allowing a plurality of users to share electric vehicles which can be operated by electric power supplied from a battery.

2. Description of the Related Art

Today, automobiles play an important role as an indispensable means for allowing people to move in and beyond local areas, and the number of automobiles being used keeps growing. The increasing number of automobiles being used not only causes serious traffic jams, but also demands more and more parking spaces. For example, medium-size cities in the outskirts of larger cities need parking spaces near stations for automobiles that are used by people who take commuter trains. However, automobiles in such parking spaces remain parked in the daytime, and are usually driven in and out of the parking lots early morning and evening for taking commuter trains and going home.

In view of such a wasteful way of using automobiles, there has been a demand for a system which allows users to rent automobiles only when necessary. In the presently available automobile rental system, a user fills out an application paper at an automobile rental company to rent an automobile, receives the key of the automobile, uses it for a desired period of time, and finally returns the automobile to the automobile rental company. This automobile rental system allows users to use automobiles only when necessary though the process to apply for the renting of automobiles is somewhat complex.

Efforts are currently being made to develop electric vehicles which are less harmful in terms of air pollution and noise than automobiles which run on fossil fuels such as gasoline, though the electric vehicles are still more expensive than the present automobiles. If electric vehicles can be shared by a plurality of users, then such a sharing system is highly economical and produces other advantages including protection against air pollution and noise.

One disadvantage of such a sharing system, however, is that batteries required to supply electric power to operate electric vehicles need to be charged to a sufficient level before they are used.

SUMMARY OF THE INVENTION

It is a general object of the present invention to provide an electric vehicle sharing system which is capable of supplying users efficiently with electric vehicles whose batteries have been appropriately charged.

A major object of the present invention is to provide an electric vehicle sharing system which can lend to users electric vehicles that can travel reliably to their destinations.

Another object of the present invention is to provide an electric vehicle sharing system which can lend to users electric vehicles whose batteries have a minimum remaining capacity required for the electric vehicles to travel reliably to their destinations.

Still another object of the present invention is to provide an electric vehicle sharing system which gives users a relatively wide range of electric vehicles to choose from.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a block diagram of a control system of an electric vehicle;

DESCRIPTION OF THE REFERRED EMBODIMENT

Figure 1:
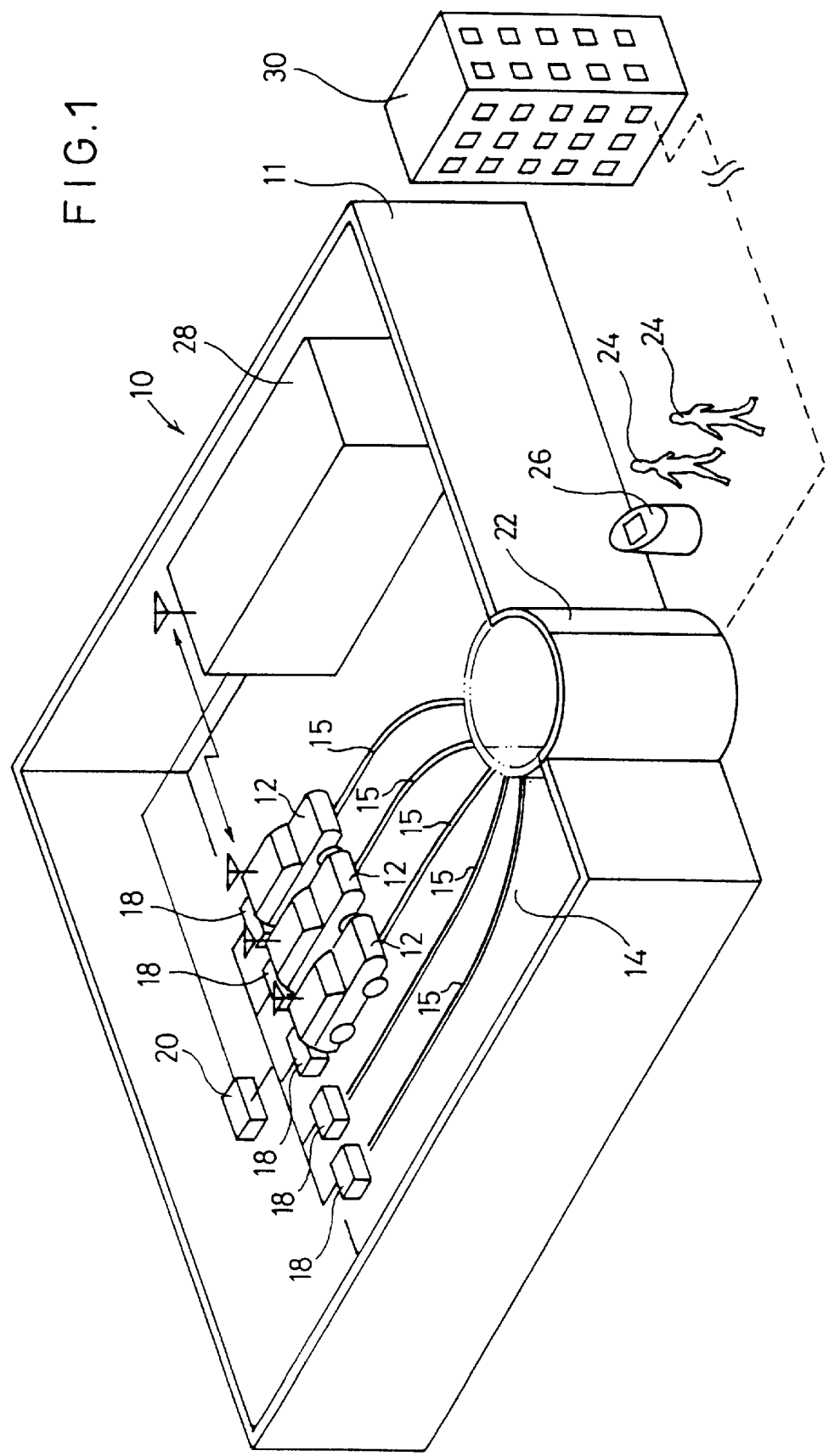
FIG. 1 is a schematic perspective view of an electric vehicle sharing system according to the present invention.

FIG. 1 schematically shows an electric vehicle sharing system according to the present invention. The electric vehicle sharing system shown in FIG. 1 has a vehicle distribution port or station 10 that is typically positioned in an area near a station, a street, etc. to which users have easy access. The vehicle distribution port 10 is usually located in a building 11, and has a parking space 14 where a plurality of electric vehicles 12 are parked. The electric vehicles 12 are parked in respective zones that are associated with respective chargers 18 for charging batteries 16 (see FIG. 2) mounted on the electric vehicles 12.

Each of the chargers 18 is controlled by a charger controller 20. The building 11 has a gate 22 through which electric vehicles 12 drive in and out of the parking space 14. A port terminal 26 is disposed near the gate 22 outside of the building 11. The port terminal 26 is operated by users 24 to rent desired electric vehicles 12 and return electric vehicles 12 after they have been used. The vehicle distribution port 10 has a system controller 28 for controlling the electric vehicle sharing system in its entirety. The system controller 28 controls the electric vehicles 12, the charger controller 20, the gate 22, and the port terminal 26. The reference numeral 30 in FIG. 1 designates a destination to which an electric vehicle 12 rented by a user 24 travels.

Figure 2:
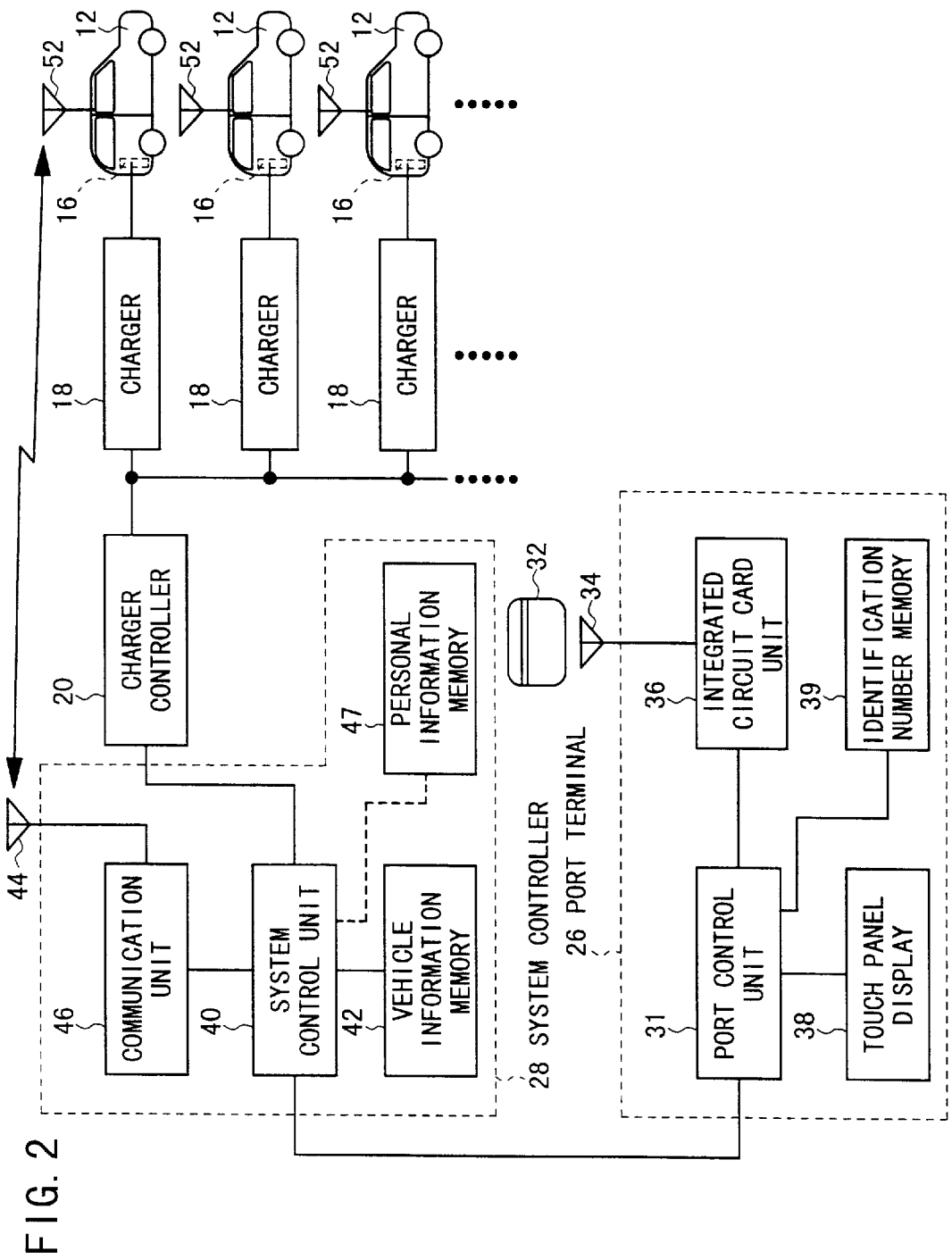
FIG. 2 is a block diagram of a system controller and a port terminal of the electric vehicle sharing system.

FIG. 2 shows in block form the port terminal 26 and the system controller 28. The port terminal 26 has a port control unit 31 and an IC (integrated circuit) card unit 36 for reading data from and writing data into an inherent IC card 32 via an antenna 34. The inherent IC card 32 stores the ID (identification) number as inherent identification number of a user 24 and personal data of the user 24. The port terminal 26 also has a touch panel display unit 38 which can be operated by the user 24, and an ID number memory 39 for storing an ID number read from the inherent ID card 32.

The port terminal 26 may have a CRT display unit or a liquid crystal display unit and a keyboard, rather than the touch panel display unit 38, so that the user 24 can enter data using the keyboard. Information may be indicated to the user 24 with the touch panel display unit 38 and also a voice guidance system. The inherent IC card 32, which is issued to each user 24, has a battery, a memory, a radio transmitter, etc. (not shown), and transmits information (the ID number of the inherent IC card 32) stored in the memory with a radio wave having a predetermined frequency with a small amount of electric energy. The memory of the inherent IC card 32 has a sufficient storage capacity for storing various other items of information than the ID number. For example, the memory of the inherent IC card 32 stores personal data representing the angle and height of a steering wheel 72 of the electric vehicle 12 used by the user 24, the position of a power seat 71 of the electric vehicle 12, the temperature setting of an air-conditioning system 65, and selected stations and music pieces of a radio set 67 of the electric vehicle 12, for example. In order to prevent the battery of the inherent IC card 32 from being unduly discharged, the inherent IC card 32 transmits information stored in the memory only when it receives a transmission command signal from the port terminal 26 and the electric vehicle 12.

The system controller 28 has a system control unit 40 connected to the port control unit 31 and a vehicle information memory 42 for storing vehicle information including inventory information, vehicle number information, battery charge information, vehicle return information, etc. of the electric vehicles 12 placed in the parking space 14. The vehicle information is received from the electric vehicles 12 via an antenna 44 by a communication unit 46. The system controller 28 also has a personal information memory 47 for storing personal data of users 24. The personal information memory 47 is required only when a common IC card (described later) is used, and is not necessary when the inherent IC card 32 according to the illustrated embodiment is used.

Figure 3:
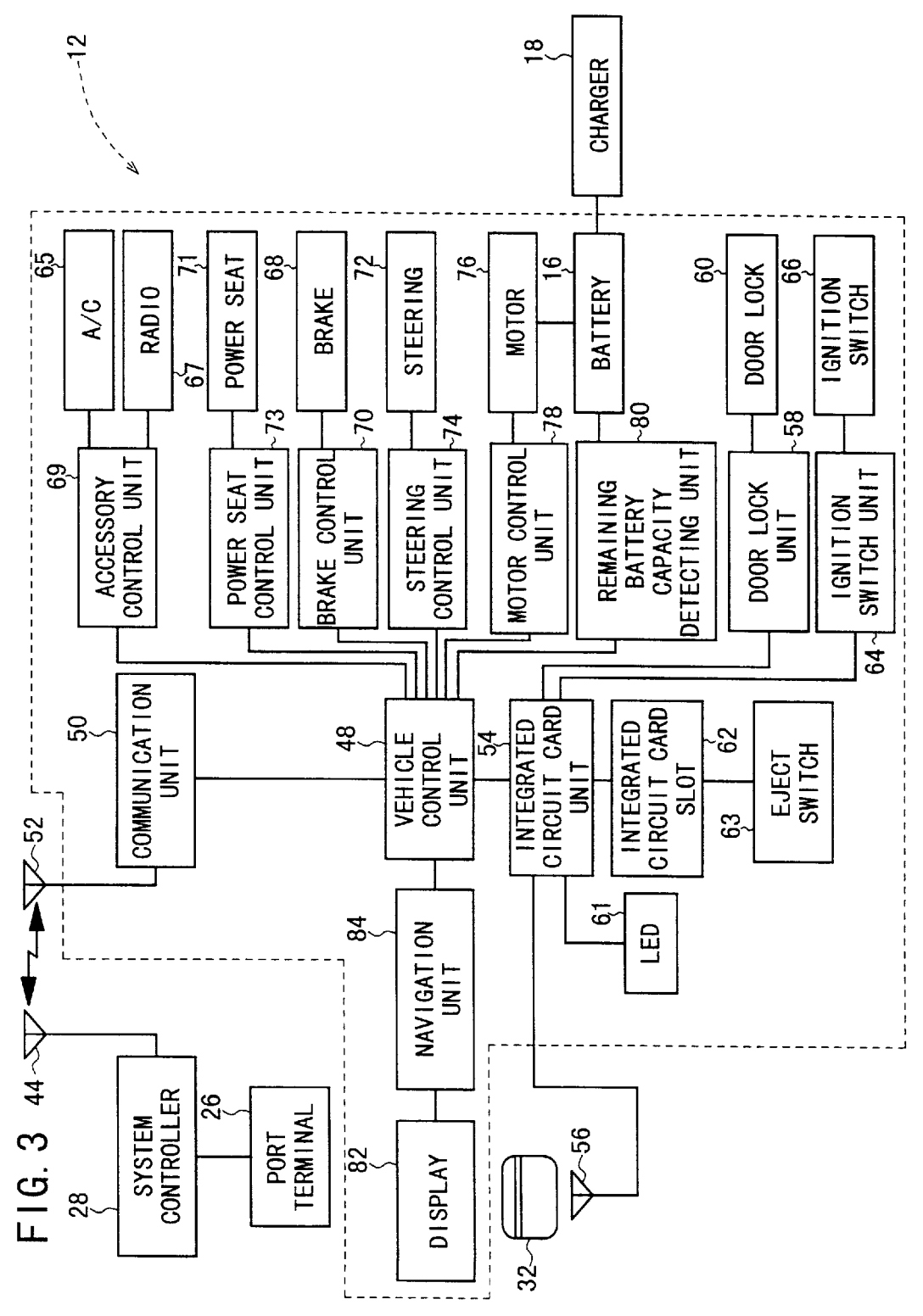

FIG. 3 shows in block form a control system of the electric vehicle 12. As shown in FIG. 3, the electric vehicle 12 has a vehicle control unit 48 for controlling the electric vehicle 12 in its entirety when it is in an automatic driving mode. To the vehicle control unit 48, there is connected a communication unit 50 for exchanging information with the system controller 28 via an antenna 52. The electric vehicle 12 has an IC card unit 54. The IC card unit 54 reads the ID number from the inherent IC card 32 via an antenna 56. When the IC card unit 54 confirms that the user 24 is a legitimate user, it controls the door lock unit 58 to release a door lock 60. The IC card unit 54 reads the personal data from inherent IC card 32 to adjust various facilities or devices on the electric vehicle 12 to personal settings corresponding to the user 24. When the inherent IC card 32 is inserted into an IC card slot 62 in the electric vehicle 12, the IC card unit 54 controls the ignition switch unit 64 to permit an ignition switch 66 to be operated. The IC card slot 62 has an eject switch 63 for ejecting the inherent IC card 32 when the user 24 gets off the electric vehicle 12. An LED 61 for indicating a card waiting mode is connected to the IC card unit 54. The LED 61 is located in a position which can be visually recognized by the user 24 outside of the electric vehicle 12.

The vehicle control unit 48 is connected to an accessory control unit 69 for controlling various accessories in the electric vehicle 12 which include an air-conditioning system (A/C) 65, a radio set 67, etc. according to the personal data, a power seat control unit 73 for controlling the position of the power seat 71 according to the personal data, a brake control unit 70 for controlling a brake 68, a steering control unit 74 for controlling a steering wheel 72, a motor control unit 78 for controlling an electric motor 76 which serves as a propulsion source of the electric vehicle 12, and a remaining battery capacity detecting unit 80 for detecting a remaining capacity of the battery 16. A navigation unit 84 having a display unit 82 is connected to the vehicle control unit 48.

The electric vehicle sharing system according to the present invention is basically constructed as described above. Operation of the electric vehicle 12 will be described below successively with respect to a vehicle lending process, a vehicle running process, and a vehicle returning process.

A vehicle lending process will be described below with reference to FIGS. 4 through 7.

When a user 24 with an inherent IC card 32 issued thereto by an IC issuing facility approaches the port terminal 26 in order to use an electric vehicle 12, the IC card unit 36 detects the inherent IC card 32 via the antenna 34. The power supply of the port terminal 26 in a sleep mode is turned on, and the port control unit 31 starts to operate, energizing the touch panel display unit 38 in step S1.

The ID number is then checked to confirm whether the inherent IC card 32 can be used or not in step S2. An IC card verification process will be described below with reference to FIG. 6.

Figure 6:
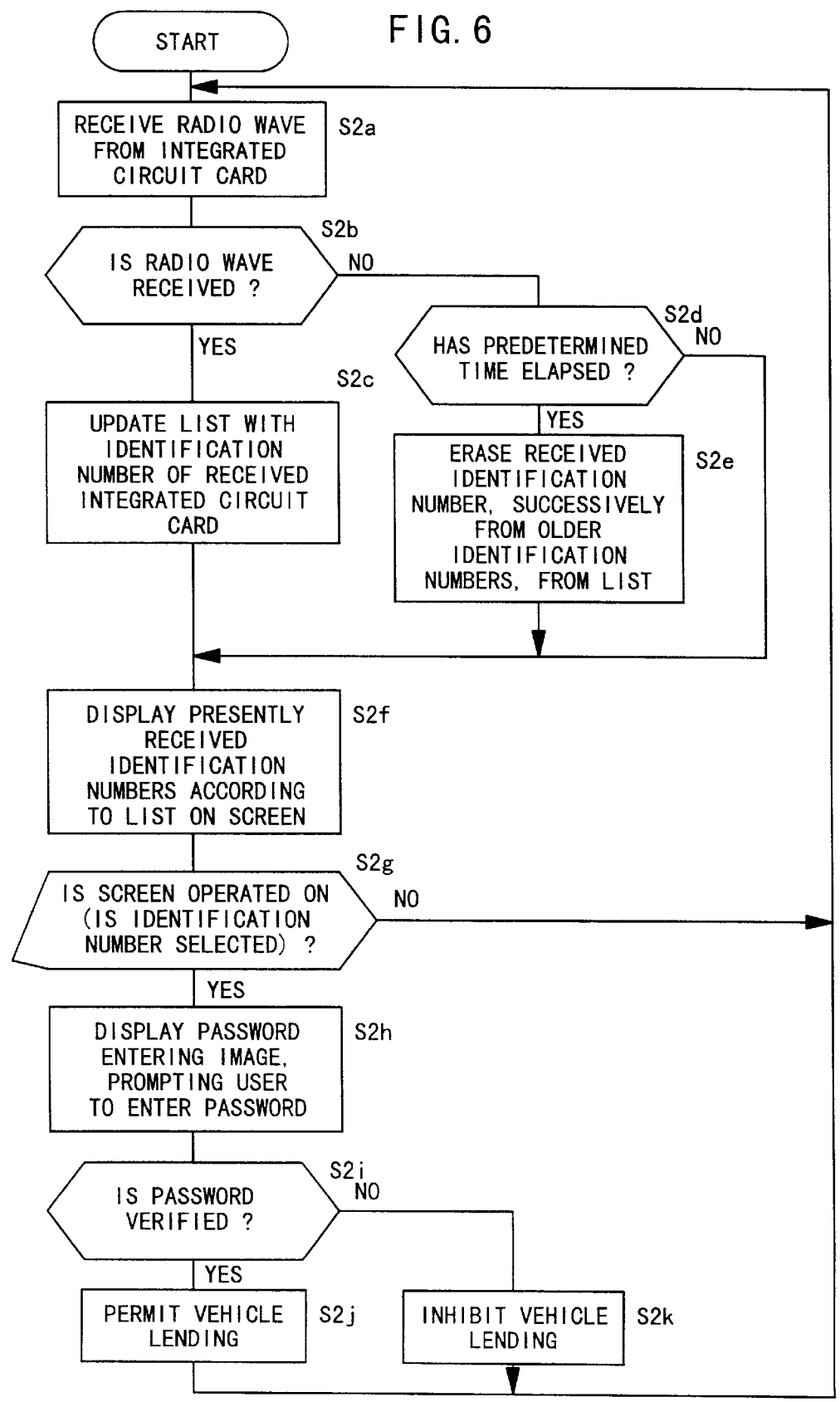
FIG. 6 is a flowchart of the subroutine of an IC card verifying process.
Figure 7:
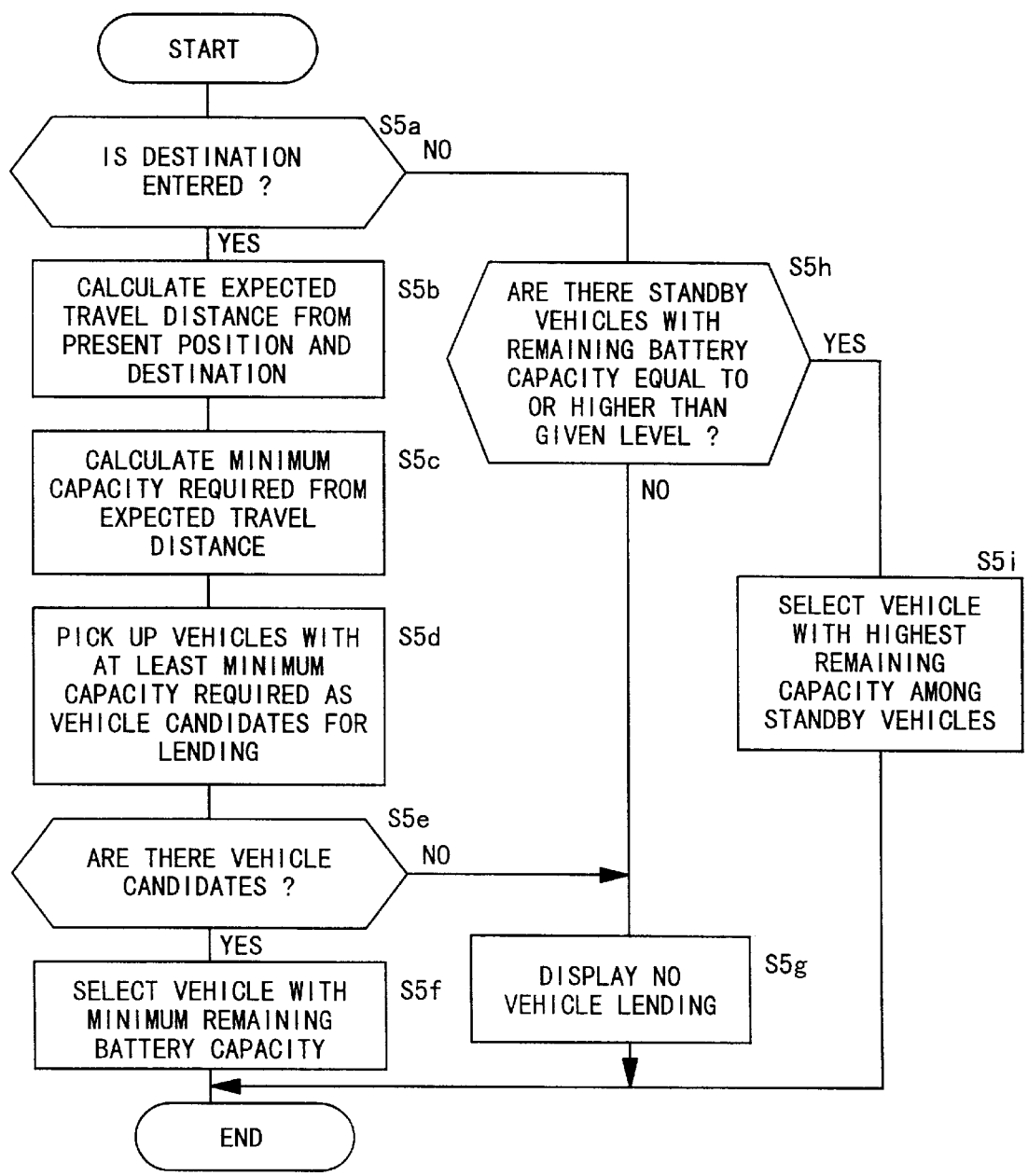
FIG. 7 is a flowchart of the subroutine of a vehicle selecting process.

The port control unit 31 repeatedly executes the IC card verification process shown in FIG. 6 to handle a plurality of users 24. Specifically, the IC card unit 36 receives a radio wave transmitted from the inherent IC card 32 in step S2a. The port control unit 31 monitors a reception status of the IC card unit 36 at all times. When the port control unit 31 detects the reception of the radio wave by the IC card unit 36 in step S2b, the port control unit 31 reads the ID number registered in the inherent IC card 32, and updates a list of ID numbers stored in ID number memory 39 in step S2c. If the port control unit 31 does not detect the reception of a radio wave by the IC card unit 36 for a predetermined period of time in step S2d, then the port control unit 31 deletes an ID number successively from older ID numbers from the list in step S2e. Therefore, an ID number which has been received within the predetermined period of time is successively registered in the list.

Figure 8:
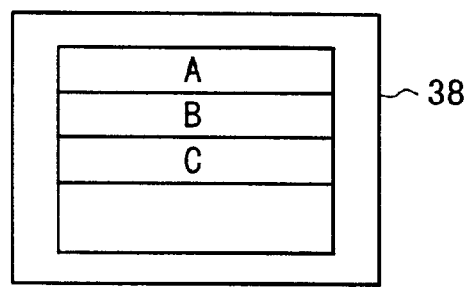
FIG. 8 is a diagram of a list of user ID numbers displayed on a display unit at the port terminal.
Figure 9:
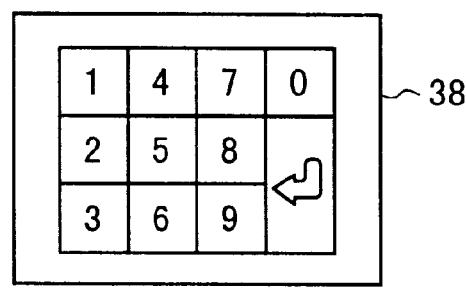
FIG. 9 is a diagram of a password entering image displayed on the display unit at the port terminal.

The port control unit 31 displays the list on the touch panel display unit 38 in step S2f. FIG. 8 shows by way of example a list of ID numbers A, B, C, . . . read from the inherent IC cards 32 of a plurality of users 24 on the touch panel display unit 38. When the user 24 selects the ID number of the inherent IC card 32 which is owned by the user 24 in step S2g, the touch panel display unit 38 displays a password entering image (see FIG. 9). The user 24 then enters its own password that has been registered in step S2h. The port control unit 31 asks the system control unit 40 of the system controller 28 to decide whether the entered password agrees with the registered password or not in step S2i. If the entered password agrees with the registered password, then the port control unit 31 permits vehicle lending to the user 24 in step S2j. If the entered password does not agree with the registered password, then the port control unit 31 determines that the user 24 cannot use an electric vehicle 12, and inhibits vehicle lending to the user 24 in step S2k.

Figure 4:
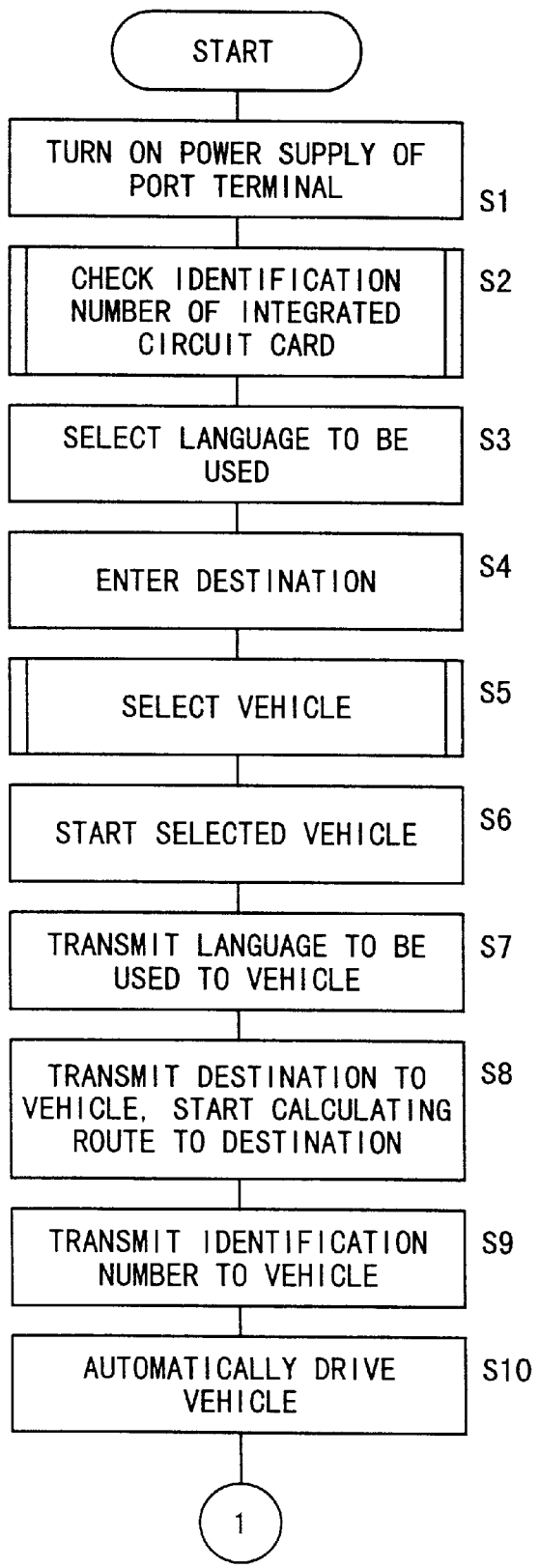
FIGS. 4 and 5 are a flowchart of the main routine of a vehicle lending process.
Figure 5:
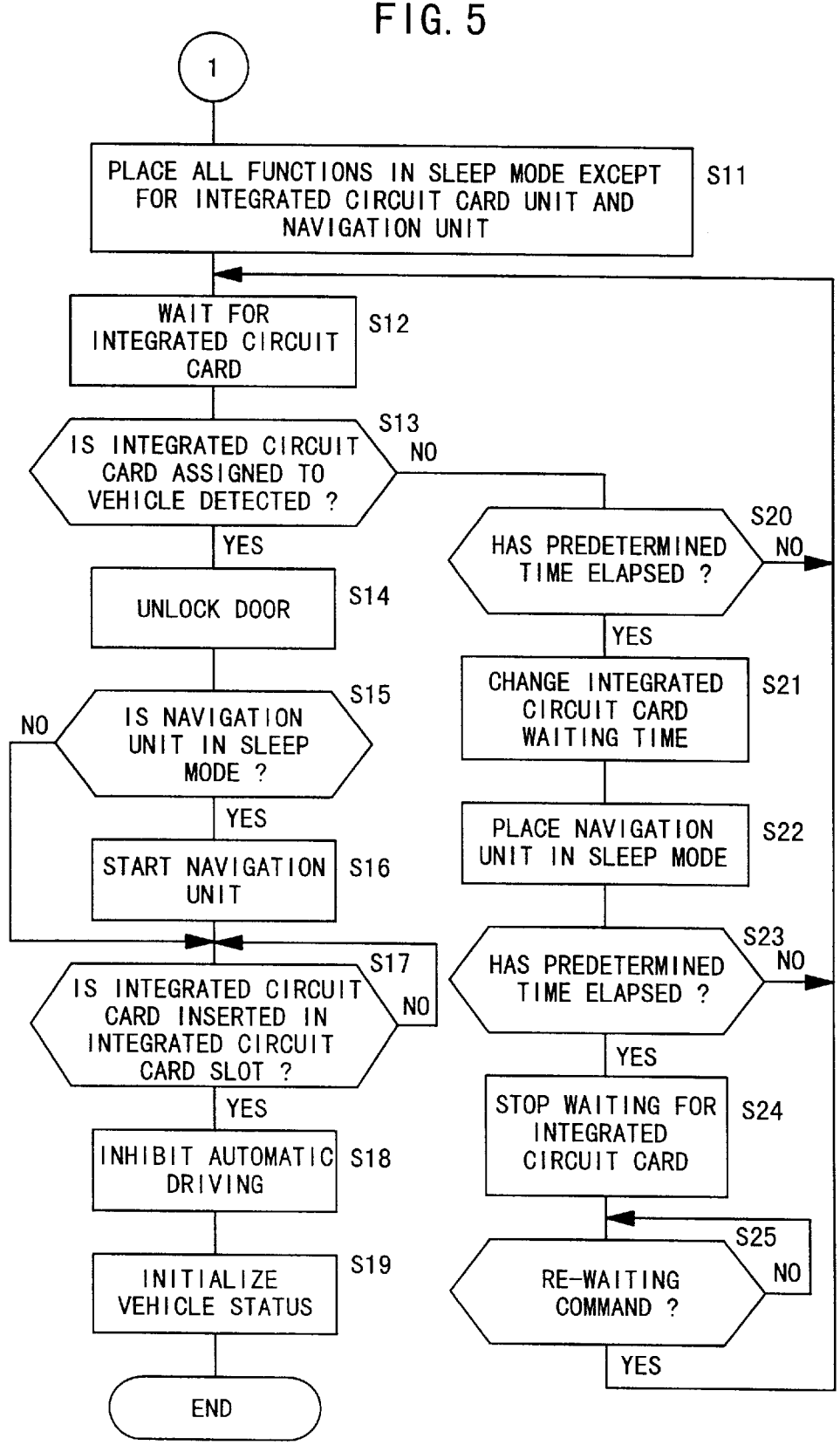

After the ID number is verified and vehicle lending is permitted, the user 24 selects a language to be used, e.g., Japanese or English, according to an instruction displayed on the touch panel display unit 38 in step S3 (see FIG. 4). When the user selects a language to be used, the selected language will be used in a displayed image for selecting a designation and displayed images on the display unit 82 in the electric vehicle 12. Information relative to the selected language can be transmitted from the IC card unit 36 via the antenna 34, recorded in the inherent IC card 32, and transferred to the system controller 28.

Figure 10:
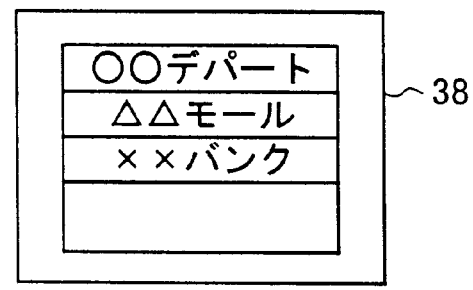
FIG. 10 is a diagram of a destination selecting image displayed on the display unit at the port terminal.

The user 24 then enters a destination 30 according to an image displayed in the selected language in step S4. FIG. 10 shows by way of example a displayed image on the touch panel display unit 38 in the case where Japanese has been selected as a language to be used. Information relative to the destination 30 selected by the user 24 is transferred to the system controller 28.

The system controller 28 then selects an electric vehicle 12 that can be lent, according to information on the distance between the destination 30 and the present position in step S5. A vehicle selecting process will be described in detail below with reference to FIG. 7.

When the destination 30 is entered in step S5a, the system controller 28 calculates the distance to travel between the present position and the destination 30. Specifically, the system controller 28 has a map information holding means for holding map information covering the destination 30, such as a known navigation system. The system controller 28 calculates a predicted travel distance from the present position, i.e., the vehicle distribution port 10, to the destination 30, according to the map information in step S5b. The predicted travel distance may be determined simply as a linear distance between the present position and the destination 30, or may be calculated as an actual route from the present position to the destination 30 using the navigation system.

Then, the system controller 28 calculates a minimum capacity required for the battery 16 on the electric vehicle 12 to enable the electric vehicle 12 to travel the predicted travel distance in step S5c. The minimum capacity can be determined, for example, as the product of an average amount V of electric energy consumed when the electric vehicle 12 travels at an average speed, the predicted travel distance L, and a safety factor K (K>1.0).

The system controller 28 picks up electric vehicles 12 whose batteries have remaining capacities equal to or greater than the calculated minimum capacity, as vehicle candidates for lending, among the electric vehicles 12 kept in the parking space 14 in step S5d.

The batteries 16 on the electric vehicles 12 kept in the parking space 14 have been charged by the respective chargers 18, and charged states of the batteries 16 are detected by the remaining battery capacity detecting units 80 of the electric vehicles 12. The remaining battery capacity of a battery 16 can be determined from an integrated value of charging currents of the battery 16. The determined remaining battery capacity is transferred to the system controller 28 via the communication unit 50, and stored, together with the vehicle number, in the vehicle information memory 42.

The system control unit 40 compares the remaining battery capacities stored in the vehicle information memory 42 with the minimum capacity. If there are vehicle candidates for lending whose batteries have remaining capacities equal to or greater than the calculated minimum capacity in step S5e, then the system control unit 40 selects an electric vehicle 12 whose battery has a minimum remaining battery capacity among the vehicle candidates for lending in step S5f. If there are no vehicle candidates for lending in step S5e, then the system control unit 40 displays a message "No vehicle lending" on the touch panel display unit 38 of the port terminal 26 in step S5g. The system control unit 40 may alternatively display a message "Only electric vehicles with small remaining battery capacities are available. Do you still want to rent an electric vehicle?", giving the user 24 an option to select such an electric vehicle.

If no destination 30 is entered in step 5a, the system control unit 40 decides whether there are electric vehicles whose batteries have remaining battery capacities equal to or greater than a predetermined level, e.g., 70% of a fully charged state, in step S5h. If there no such electric vehicles, then the system control unit 40 displays the message "No vehicle lending" on the touch panel display unit 38 of the port terminal 26 in step S5g. If there are such electric vehicles, then the system control unit 40 selects an electric vehicle 12 whose battery has a maximum remaining battery capacity among the standby vehicles in step S5i.

As described above, if the destination 30 is entered, then an electric vehicle 12 that can be lent whose remaining battery capacity is minimum is selected, thus giving subsequent users 24 a range of selectable electric vehicles. If no destination 30 is entered, then an electric vehicle 12 that can be lent whose remaining battery capacity is maximum is selected, thus lending an electric vehicle 12 which is safer in terms of traveling capability to the user 24 whose travel distance is unknown.

After the electric vehicle 12 is thus selected, the system control unit 40 causes the communication unit 46 to start to operate the vehicle control unit 48 of the selected electric vehicle 12 in step S6. Until the selected electric vehicle 12 reaches the user 24, the IC card unit 54 of the electric vehicle 12 remains inactive so that the door lock will not be released or other troubles will not occur. Therefore, the LED 61 for indicating the card waiting mode also remains turned off.

The system control unit 40 transfers information as to the language selected by the user 24 in step S3 to the vehicle control unit 48 of the electric vehicle 12. The vehicle control unit 48 sets the navigation unit 84 to the information as to the selected language in step S7.

The system control unit 40 transfers information as to the destination 30 entered by the user 24 in step S4 to the vehicle control unit 48 of the electric vehicle 12. The vehicle control unit 48 transfers the information as to the destination 30 to the navigation unit 84, which then calculates a route to the destination 30 in step S8. The navigation unit 84 may calculate the route to the destination 30, or may directly receive a route calculated by the system controller 28.

The system control unit 40 transfers information as to the ID number of the inherent IC card 32 owned by the user 24 to the vehicle control unit 48 of the electric vehicle 12 in step S9.

Thereafter, the system controller 28 instructs the selected electric vehicle 12 to be automatically driven in step S10. The vehicle control unit 48 of the electric vehicle 12 thus instructed controls the motor control unit 78, the steering control unit 74, and the brake control unit 70 to operate the motor 76, the steering wheel 72, and the brake 68 to automatically drive the electric vehicle 12 to the gate 22. The navigation unit 84 may calculate the route to the destination 30 until the electric vehicle 12 is automatically driven to the gate 22.

The electric vehicle 12 may be automatically driven in various ways. For example, a white line 15 (see FIG. 1) in the parking space 14 may be detected by a sensor (not shown) on the electric vehicle 12, and the electric vehicle 12 may be controlled to follow the detected white line 15. Alternatively, the electric vehicle 12 may travel to a destination (the gate 22) while detecting and avoiding obstacles with a camera and/or a radar. Further alternatively, map information in the vehicle distribution port 10 may be stored in the navigation unit 84 of the electric vehicle 12, and the detected positional information of the electric vehicle 12 and the map information may be compared with each other to guide the electric vehicle 12 to the gate 22. Furthermore, the above automatic driving processes may be combined with each other. The electric vehicle 12 may be automatically driven in the same manner as described above when it is to return to a given position in the parking space 14. When the electric vehicle 12 returns to the given position in the parking space 14, the position of the charger 18 is detected, and the electric vehicle 12 is automatically guided to connect a charging connector (not shown) of the battery 16 properly to the charger 18.

After the electric vehicle 12 has been automatically driven to and stopped at a position where the user 24 is waiting, the automatically driving of the electric vehicle 12 is completed, and all functions of the electric vehicle 12 including the display unit 82, except for the IC card unit 54 and the navigation unit 84, are brought into a sleep mode in step S11. The electric vehicle 12 now waits for the inherent IC card 32 owned by the user 24 in step S12. At this time, the LED 61 starts flickering, allowing the user 24 to visually recognize, from outside of the electric vehicle 12, that the electric vehicle 12 is waiting for the inherent IC card 32. Since all the functions of the electric vehicle 12 except for the necessary functions are placed in the sleep mode, the electric vehicle 12 is prevented from malfunctioning while being automatically driven, and an unwanted consumption of battery energy is prevented until the user 24 gets on the electric vehicle 12.

Figure 11:
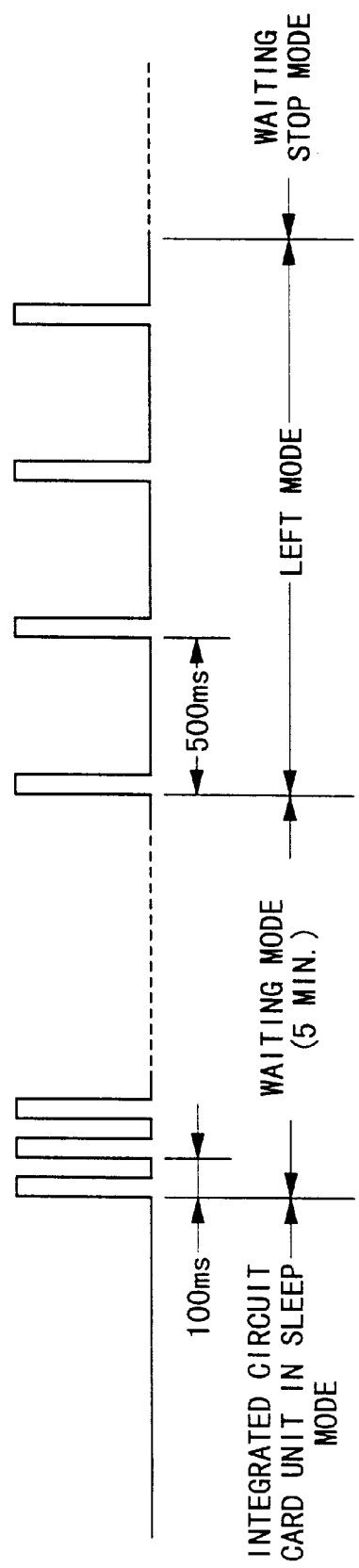
FIG. 11 is a timing chart of an ID number reading process carried out by an IC card unit.

Specifically, as shown in FIG. 11, the IC card unit 54 transmits a transmission command signal intermittently at intervals of 106 ms in order to read the ID number of the inherent IC card 32. The LED 61 flickers at intervals of 100 ms depending on a reading process carried out by the IC card unit 54. While in the card waiting mode, when the user 24 moves the inherent IC card 32 closely to the electric vehicle 12, the IC card unit 54 receives a radio wave transmitted from the inherent IC card 32, recognizes the ID number thereof, and checks the recognized ID number against the IC number that has been transferred from the system controller 28 in step S9. If the ID numbers agree with each other in step S13, then the IC card unit 54 determines the electric vehicle 12 as the electric vehicle selected by the user 24, and controls the door lock unit 58 to release the door lock 60 in step S14. If the door lock 60 is not released a predetermined period of time after the electric vehicle 12 has arrived at the user 24, then the IC card unit 54 brings the navigation unit 84 into the sleep mode, thus avoiding an undesirable consumption of battery energy.

If the navigation unit 84 has been in the sleep mode in step S15, the IC card unit 54 restarts the navigation unit 84 in step S16, which displays map information using the selected language on the display unit 82. Specifically, the navigation unit 84 displays images using the selected language on the display unit 82 based on the information as to the selected language transferred from the system controller 28. Inasmuch as the navigation unit 84 quickly displays on the display unit 82 the route to the destination 30 that has been calculated while the electric vehicle 12 is being automatically driven, the user 24 can quickly go to the destination 30 according to the displayed route.

If the user 24 inserts the inherent IC card 32 into the IC card slot 62 after getting on the electric vehicle 12 in step S17, the IC card unit 54 determines that the inherent IC card 32 is inserted in the IC card slot 62, outputs an automatic driving inhibit signal to the vehicle control unit 48, switching to a manual driving mode in step S18. Then, the IC card unit 54 reads the personal data recorded in the inherent IC card 32, initializes the electric vehicle 12 according to the personal data of the user 24, and allows the ignition switch 66 to be operated by the user 24 in step S19.

If the personal data are recorded in the inherent IC card 32, then the vehicle control unit 48 controls the steering control unit 74, for example, to automatically adjust the height and angle of the steering wheel 72 to desired settings according to the recorded personal data. Similarly, the vehicle control unit 48 controls the power seat control unit 74 to automatically adjust the power seat 71 to a desired position according to the recorded personal data, and also controls the accessory control unit 69 to automatically adjust the air-conditioning system 65 and the radio set 67 to desired settings according to the recorded personal data.

If no personal data are recorded in the inherent IC card 32, then the vehicle control unit 48 does not carry out the above adjusting operations.

If the inherent IC card 32 of the user is not detected in step S13, the IC card unit 54 decides whether a predetermined period of time, e.g., a continued waiting period of 5 minutes, has elapsed after the electric vehicle 12 has stopped in front of the port terminal 26 in step S20. If the IC card unit 54 receives a radio wave from the inherent IC card 32 at intervals of 100 ms prior to the elapse of 5 minutes, and then 5 minutes elapse, the IC card unit 54 changes the interval of time for waiting for the inherent IC card 32 from 100 ms to 500 ms (left mode), for example, and receives the radio wave from the inherent IC card 32 in step S21. The IC card unit 54 then brings the navigation unit 84 into the sleep mode in step S22. Then, the IC card unit 54 decides whether a predetermined period of time has elapsed in step S23. If the predetermined period of time has elapsed, then the IC card unit 54 stops waiting for the inherent IC card 32 in step S24. The above process is carried out because the user 24 may have temporarily moved to someplace else. If a re-waiting command is entered as when the user 24 operates the door knob in step S25, then control returns to step S12, and the processing in and after step S12 is repeated. The interval of waiting time is an interval of the time in which the IC card unit 54 receives a radio wave from the inherent IC card 32 and the time in which the IC card unit 54 stops receiving a radio wave from the inherent IC card 32. By changing the interval of waiting time from 100 ms to 500 ms, the power consumption by the IC card unit 54 is reduced, saving the electric energy stored in the battery 16 accordingly.

In this manner, while in the card waiting mode, the IC card unit 54 is operated intermittently at the intervals of 100 ms. If the IC card unit 54 fails to recognize the inherent IC card 32 after elapse of a predetermined period of time, then the IC card unit 54 is operated intermittently at the intervals of 500 ms. If the IC card unit 54 still fails to recognize the inherent IC card 32, then the IC card unit 54 stops waiting for the inherent IC card 32. Therefore, the power consumption by the IC card unit 54 is minimized, saving the electric energy stored in the battery 16 accordingly.

After the user 24 gets on the electric vehicle 12 in the fashion described above, the electric vehicle 12 starts running toward the destination 30.

Figure 12:
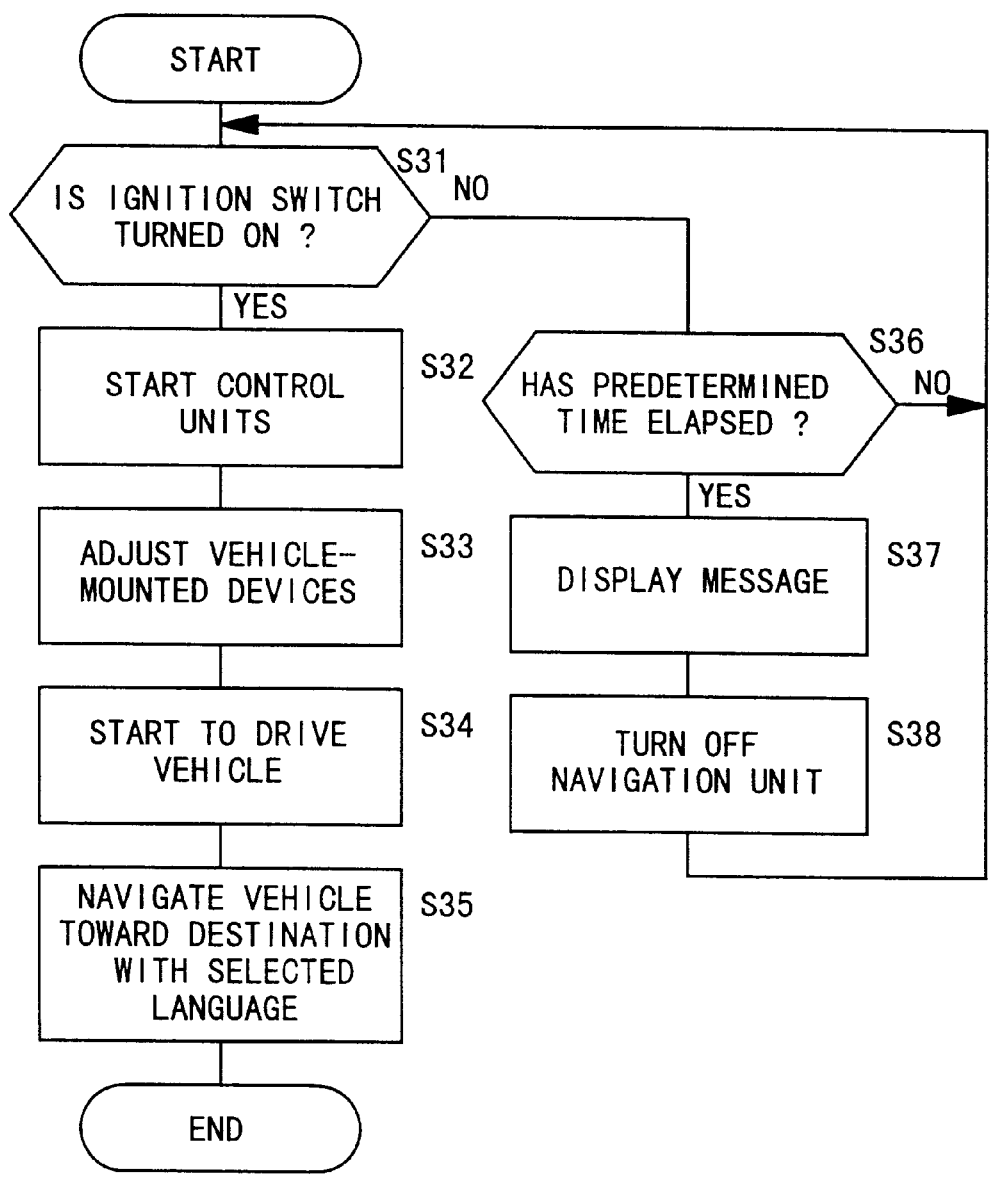
FIG. 12 is a flowchart of a vehicle running process.

A vehicle running process will be described below with reference to FIG. 12.

When the user 24 turns on the ignition switch 66 in step S31, the electric vehicle 12 is turned on, starting to operate the brake control unit 70, the steering control unit 74, the motor control unit 78, the remaining battery capacity detecting unit 80, and the door lock unit 58 which are required to drive the electric vehicle 12 in step S32. The electric vehicle 12 can now be driven by the user 24. The position of the steering wheel 72, the position of the power seat 71, and settings of other vehicle-mounted devices are manually adjusted by the user 24 in step S33. Personal data representing the adjusted settings are recorded in the inherent IC card 32 by the IC card unit 54. Therefore, the personal data already recorded in the inherent IC card 32 are updated. The personal data thus recorded may be transferred to the system controller 28 via the communication unit 50, and recorded thereby.

Subsequent to the above preparatory action, the electric vehicle 12 starts traveling to the destination 30 in step S34. At this time, the route to the destination 30 already calculated until the electric vehicle 12 reaches the user 24 is displayed in the selected language on the display unit 82, together with voice guidance, if necessary, in the selected language in step S35. If Japanese, for example, has been selected as the language to be used, an audible message in Japanese corresponding to "Right turn ahead" is outputted. If English has been selected as the language to be used, an audible message "Right turn ahead" is outputted.

If the ignition switch 66 is not operated by the user 24 in step S31 and a predetermined period of time has elapsed in step S36, a message "Navigation unit will be turned off to reduce battery energy consumption" is displayed on the display unit 82 in step S37, and then the navigation unit 84 is turned off in step S38.

Figure 13:
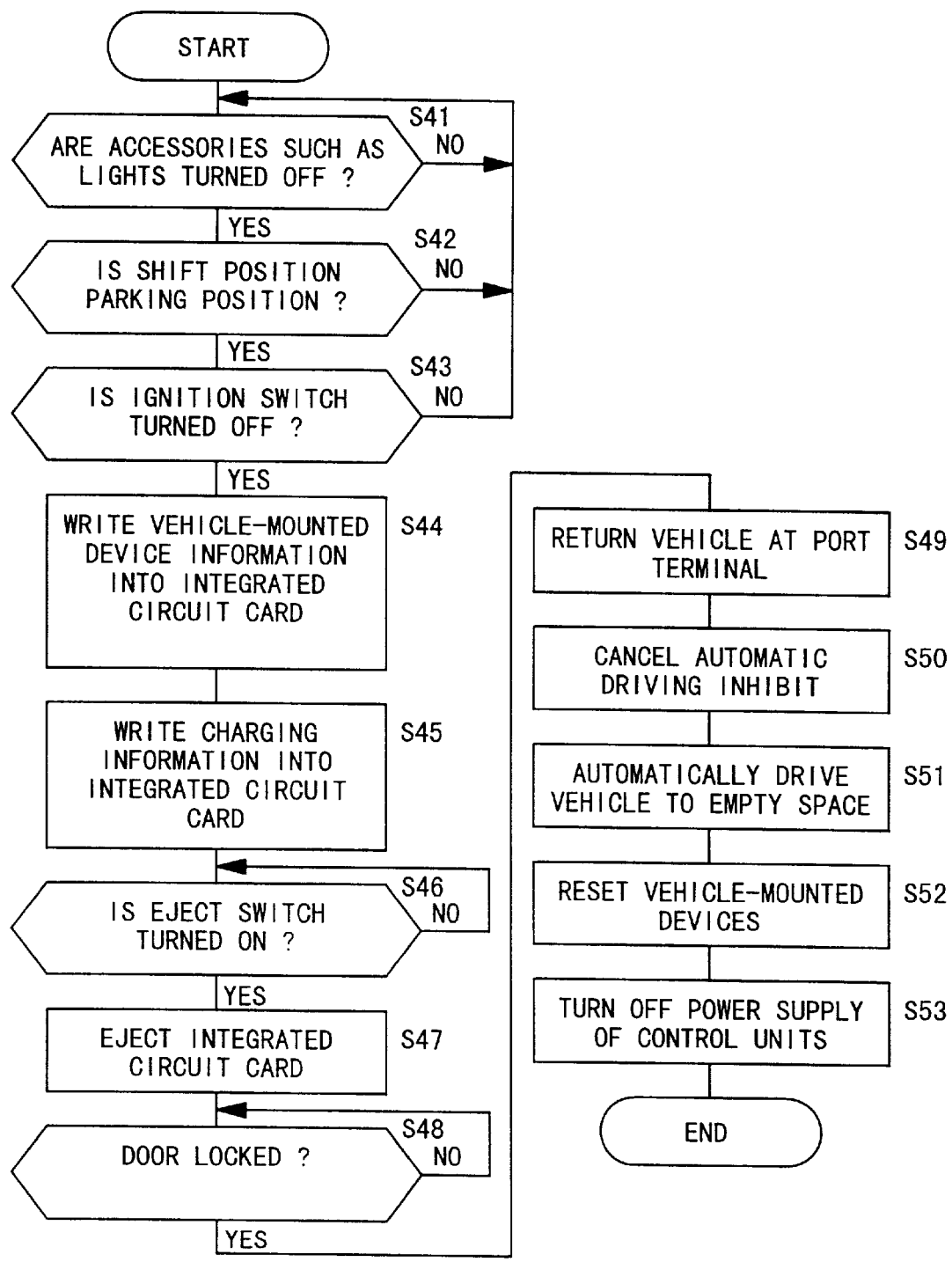
FIG. 13 is a flowchart of a vehicle returning process.

After the electric vehicle 12 reaches the destination 30, the electric vehicle 12 is returned to the vehicle distribution port 10. A vehicle returning process will be described below with reference to FIG. 13.

After driving the electric vehicle 12 to the gate 22 of the vehicle distribution port 10, the user 24 turns off the accessories such as lights, moves the shift lever to the parking position, and turns off the ignition switch 66. If the accessories have been turned off, the shift lever has moved to the parking position, and the ignition switch 66 has been turned off in steps S41, S42, S43, the IC card unit 36 records the present settings of the vehicle-mounted devices including the steering wheel 72, the seat, etc. in the inherent IC card 32 in step S44, or transfers the present settings to the system controller 28. Then, the IC card unit 36 calculates charging information based on the traveled distance and the amount of electric energy consumed from the battery 16, records the calculated charging information in the inherent IC card 32 in step S45 or transfers the calculated charging information to the system controller 28.

Then, if the eject switch 63 is operated by the user 24 in step S46, the IC card 32 is ejected from the IC card slot 62 only when all the vehicle-mounted devices are in predetermines states in step S47. Specifically, the IC card 32 is allowed to be ejected from the IC card slot 62 if it is confirmed that the accessories have been turned off, the shift lever has moved to the parking position, and the ignition switch 66 has been turned off. After the IC card 32 is ejected from the IC card slot 62, a message "Do not leave anything in vehicle" may be displayed on the display unit 82 or given as voice guidance to prompt the user not to forget things in the electric vehicle 12.

Then, the user 24 gets off the electric vehicle 12, closes the door, and moves to the port terminal 62. If the door is partly open and is not locked by the door lock 60, a message "Lock door and return vehicle" may be displayed as an image or given as a voice warning at the port terminal 26.

After the user 24 has locked the door in step S48, the user 24 returns the electric vehicle 12 using the port terminal 26 in step S49. For example, the user 24 takes the inherent IC card 32 closely to the port terminal 26, enabling the port terminal 26 to recognize the ID number thereof, and then operates the port terminal 26 for returning the electric vehicle 12.

After the user 24 returns the electric vehicle 24, the vehicle control unit 48 cancels the inhibition of the automatic driving, making the electric vehicle 24 automatically drivable in step S50. The inhibition of the automatic driving may be canceled after elapse of a sufficient period of time required until the vehicle returning process is completed after the IC card unit 54 has detected that the user 24 elects the inherent IC card 32 from the IC card slot 62.

Then, the electric vehicle 12 enters the automatic driving mode, and then is automatically returned to an empty area in the parking space 14 by the system controller 28 in step S51. The charger 18 is then connected to the returned electric vehicle 12, whereupon the system control unit 40 detects that the electric vehicle 12 has been returned based on a charging start signal from the charging controller 20, and transmits a reset signal to the electric vehicle 12. The system control unit 40 transmits the reset signal via the communication unit 46 to the electric vehicle 12. The vehicle control system 48 on the electric vehicle 12 receives the reset signal from the system controller 28 via the communication unit 50, and resets the vehicle-mounted devices including the steering wheel 72, the power seat 71, the air-conditioning system 65, and the radio set 67 to initial states independent of the personal data of the user 24 in step S52. The charger 18 then starts charging the battery 16 on the electric vehicle 12. Then, the power supply for the control units except the remaining battery capacity detecting unit 80 on the electric vehicle 12 is turned off, and the electric vehicle 12 is in a standby state for subsequent use in step S53.

When personal data from the inherent IC card 32 of a next user 24 are supplied to the electronic vehicle 12 thus reset to the initial states, the electronic vehicle 12 is set to states depending on the next user 24.

In the above vehicle returning process, the user 24 returns the electric vehicle 12 to the vehicle distribution port 10. If the user 24 gets off the electric vehicle 12 temporarily at an arbitrary place, then the processing in steps S49 through S52 is not executed, and when it was confirmed in step S48 that the door was locked, the power supply for the control units on the electric vehicle 12 is turned off in step S53. The electric vehicle 12 is now in a standby state until the user 24 gets on the electric vehicle 12 again.

In the above illustrated embodiment, images are displayed on the navigation unit 84 using the selected language. Statuses of the air-conditioning system 65 and the radio set 67 and details on how to use them may be displayed and/or explained in voice guidance using the selected language.

While information as to the selected language entered by the user 24 via the port terminal 26 is transferred to the selected electric vehicle 12 via the system controller 28 in the illustrated embodiment, the information as to the selected language may be transferred from the inherent IC card 32 to the electric vehicle 12. For example, the user 24 may select a language to be used with the port terminal 26, and the selected language may be recorded in the inherent IC card 32. When the selected electric vehicle 12 is automatically driven to the user 24 and the door lock is released using the inherent IC card 32, the IC card unit 54 may read the information as to the selected language recorded in the inherent IC card 32, and transfer the information to the navigation unit 84. The navigation unit 84 may then display a desired image on the display unit 82 according to the selected language.

In the illustrated embodiment, the inherent IC card 32 is issued as a card key to each of the users 24, and holds personal data. Until the electric vehicle sharing system according to the present invention becomes widespread in use, further efforts have to be made to study the management of personal data and charging methods. Therefore, it will take some time for the electric vehicle sharing system to be actually put into service. In the future, each user may possibly own its own inherent IC card 32 like bank cash cards and credit cards. Until then, some users 24 want to use the electric vehicle sharing system only temporarily and some users 24 want to own their inherent IC cards 32 for using the electric vehicle sharing system.

For using the electric vehicle sharing system temporarily, a common IC card as a card key may be issued for use by a plurality of users 24, and personal data of users may be set in the selected electric vehicle 12 using the common IC card.

More specifically, before a user 24 who does not have an inherent IC card 32 rents an electric vehicle 12 at the port terminal 26, a common IC card is issued to the user 24. If the personal information memory 47 of the system controller 28 holds personal data in the past of the user 24, then the personal data searched for based on the ID number of the user 24 is recorded in the common IC card, and then the common IC card is issued to the user 24. For a user 24 who uses the electric vehicle sharing system for the first time, standard default values may be recorded in a common IC card, and the common IC card may be issued.

The user 24 who owns the common IC card with the personal data recorded therein can use an electric vehicle adjusted according to the recorded personal data, in the same manner as the user 24 who owns the inherent IC card 32.

When the user 24 who uses the common IC card returns the electric vehicle 12, the user 24 also needs to return the common IC card. At this time, the personal data recorded in the common IC card is recorded in the personal information memory 47 based on the IC number of the user 24, and will be used when the same user 24 rents an electric vehicle 12 for the next time.

As described above, insofar as the user 24 has its own inherent IC card 32, the user 24 can rent and return an electric vehicle 12 without any personnel attended. Therefore, the electric vehicle sharing system is a labor saver and can operate over an extended period of time. If a common IC card is issued to the user 24, then it is only necessary to prepare as many common IC cards as the number of electric vehicles 12 kept in the vehicle distribution port 10, and a quick and safe action can be taken when a common IC card is missing. Another advantage obtained when the electric vehicle sharing system is temporarily used is that it is simple for a user to apply for a common IC card, i.e., to obtain a membership in the electric vehicle sharing system.

In the above embodiment, the ID data of the user 24 are recognized by the port terminal 26 or the electric vehicle 12 using the inherent IC card 32 which is of the non-contact type. However, IC cards of the contact type which has electric contacts may be used. The vehicles used in the system according to the present invention are not limited to electric vehicles 12, but may be hybrid vehicles which employ both electric energy and gasoline as propulsive energies.

In the electric vehicle sharing system according to the present invention, as described above, when the remaining battery capacity detecting unit 80 (remaining battery capacity detecting means) detects remaining battery capacities of a plurality of electric vehicles 12, and a user enters a destination via the touch panel display unit 38 (destination entering means), the system control unit 40 (vehicle determining means) determines an electric vehicle having a remaining battery capacity required for the electric vehicle to travel to the destination, and supplies the determined electric vehicle to the user. The user can thus use the supplied electric vehicle to drive to the destination.

If the system control unit 40 determines an electric vehicle having a minimum remaining battery capacity greater than the remaining battery capacity required for the electric vehicle to travel to the destination, then a next user is given a sufficient range of selectable electric vehicles.

Although a certain preferred embodiment of the present invention has been shown and described in detail, it should be understood that various changes and modifications may be made therein without departing from the scope of the appended claims.

What is claimed is:

1. An electric vehicle sharing system comprising:
   a plurality of shared electric vehicles operable by electric power supplied from a battery;
   a standby station for keeping said shared electric vehicles;
   operating means for performing a lending process for the electric vehicles;
   remaining battery capacity detecting means for detecting remaining battery capacities of the electric vehicles kept in said standby station; and
   vehicle determining means for determining an electric vehicle to be lent to said user among the electric vehicles based on the detected remaining battery capacities.

2. An electric vehicle sharing system according to claim 1, wherein said vehicle determining means comprises means for determining an electric vehicle having a remaining battery capacity equal to or greater than a predetermined level as said electric vehicle to be lent to said user.

3. An electric vehicle sharing system according to claim 2, wherein said vehicle determining means comprises means for determining an electric vehicle having a minimum remaining battery capacity among a plurality of electric vehicles having remaining battery capacities equal to or greater than said predetermined level, as said electric vehicle to be lent to said user.

4. An electric vehicle sharing system according to claim 2, wherein said predetermined level comprises a battery capacity required for an electric vehicle to travel to a destination.

5. An electric vehicle sharing system comprising:
   a plurality of shared electric vehicles operable by electric power supplied from a battery;
   a standby station for keeping said shared electric vehicles;
   operating means for performing a lending process for the electric vehicles;
   destination entering means for entering the destination of a user of an electric vehicle;
   remaining battery capacity detecting means for detecting remaining battery capacities of the electric vehicles kept in said standby station; and vehicle determining means for determining an electric vehicle to be lent to said user among the electric vehicles based on the entered destination and the detected remaining battery capacities.

6. An electric vehicle sharing system according to claim 5, wherein said vehicle determining means comprises means for determining an electric vehicle having a maximum remaining battery as said electric vehicle to be lent if the destination of the user is not entered via said destination entering means.

7. An electric vehicle sharing system according to claim 6, wherein said vehicle determining means comprises means for indicating that no electric vehicle can be lent if there are no electric vehicles having a battery capacity equal to or greater than a predetermined level.

8. An electric vehicle sharing system according to claim 5, wherein said vehicle determining means comprises means for calculating a distance from said standby station to said destination, and determining the electric vehicle to be lent based on the calculated distance and the detected remaining battery capacities.

9. An electric vehicle sharing system according to claim 5, wherein said vehicle determining means comprises means for calculating a predicted route from said standby station to said destination, and determining the electric vehicle to be lent based on the distance along said predicted route and the detected remaining battery capacities.

10. An electric vehicle sharing system according to claim 9, wherein said vehicle determining means comprises map information holding means for holding map information covering said destination, and calculating the distance along said predicted route based on said map information.

11. An electric vehicle sharing system according to claim 5, wherein said vehicle determining means comprises means for calculating a battery capacity required for an electric vehicle to travel to said destination, and means for determining an electric vehicle having a remaining battery capacity greater than said calculated battery capacity as said electric vehicle to be lent.

12. An electric vehicle sharing system according to claim 11, wherein said vehicle determining means comprises means for determining an electric vehicle having a minimum remaining battery capacity greater than said calculated battery capacity as said electric vehicle to be lent.

13. An electric vehicle sharing system according to claim 11, wherein said vehicle determining means comprises means for indicating that no electric vehicle can be lent if there are no electric vehicles having a battery capacity equal to or greater than said calculated battery capacity.

* * * * *